United States Patent
Kim et al.

(10) Patent No.: US 6,779,186 B2
(45) Date of Patent: Aug. 17, 2004

(54) METHOD FOR OPERATING AND MAINTENANCE BY BASE STATION USING REMOTE PROCEDURE CALL IN IMT-2000 SYSTEM

(75) Inventors: Soo-Yong Kim, Ichon-shi (KR); Seok-Gue Hong, Ichon-shi (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 475 days.

(21) Appl. No.: 09/767,002

(22) Filed: Jan. 22, 2001

(65) Prior Publication Data

US 2001/0016882 A1 Aug. 23, 2001

(30) Foreign Application Priority Data

Feb. 22, 2000 (KR) .......................................... 2000-8518

(51) Int. Cl.[7] .................................................. G06F 9/46
(52) U.S. Cl. ...................................... 719/330; 709/203
(58) Field of Search .................................. 709/330, 316, 709/332, 218, 219, 203, 220, 223; 370/335, 329; 719/330

(56) References Cited

U.S. PATENT DOCUMENTS

| | | | | |
|---|---|---|---|---|
| 5,872,973 A | * | 2/1999 | Mitchell et al. ............. | 709/332 |
| 5,926,636 A | | 7/1999 | Lam et al. .................... | 395/683 |
| 6,151,639 A | * | 11/2000 | Tucker et al. ................ | 709/316 |
| 6,223,217 B1 | * | 4/2001 | Pettus ........................... | 709/219 |
| 6,560,639 B1 | * | 5/2003 | Dan et al. .................... | 709/218 |
| 6,621,809 B1 | * | 9/2003 | Lee et al. .................... | 370/335 |
| 6,631,424 B1 | * | 10/2003 | McDonough et al. ....... | 709/330 |

OTHER PUBLICATIONS

Nah et al. "A Signaling Transport Structure for ATM–based IMT–2000 Exchange" 1997 IEEE, pp. 265–269.*

Padovan et al. "An Overview of Third Generation Mobile Communications Systems: IMT–2000" 1998 IEEE, pp. 360–364.*

* cited by examiner

*Primary Examiner*—Meng-Al T. An
*Assistant Examiner*—Van Hoa Nguyen
(74) *Attorney, Agent, or Firm*—Baker Botts LLP

(57) ABSTRACT

The present invention relate to a method for the operation and maintenance of a base station (BS) using a remote procedure call (RPC) in an international mobile telecommunication-2000 (IMT-2000) system which includes a base station environment management system (BEMS), a RPC process, an access control processor (ACP), an ATM interference processor (AIP) and an access signaling processor (ASP).

3 Claims, 2 Drawing Sheets

METHOD FOR OPERATING AND MAINTENANCE BY BASE STATION USING REMOTE PROCEDURE CALL IN IMT-2000 SYSTEM

FIELD OF THE INVENTION

This invention relates to a method for an operating and maintenance by a base station using a remote procedure call in an international mobile telecommunication-2000 (IMT-2000) system; and more particularly, to a method for an operating and maintenance using a remote procedure call in the IMT-2000 system, when performing an operating and maintenance by a base station between a base station and a base station environment management station.

DESCRIPTION OF THE PRIOR ART

Generally, a function of an operating and maintenance of a base station (BS) in an international mobile telecommunication-2000 (IMT-2000) system includes functions of operating, maintaining and repairing a BS system.

Typical functions of the operating and maintenance to manage the BS are as follows: functions of a configuration management, a fault management, a performance management, accounting management and a security management.

The function of the configuration management refers to a function of an open system interconnection (OSI) management including a function of a telecommunication management network (TMN) management that a network resource control and identification are performed, data is provided by the network and to the network.

The function of the performance management refers to a function including a performance supervision, a performance analysis, a performance management and control. Also, the function of the performance management refers to a function to perform a proper performance management by collecting and analyzing data related to the performance, in order to increase utilization efficiency and a service quality of a network and determine if a network configuration is proper in the IMT-2000 system.

To perform the function of the fault management, a database of a supervision condition and a test database are necessary. Data related to an alarm analysis, a fault partialization and a transmission performance supervision and data transmitted from an operating system are stored in the database of a supervision condition. A record on which a location of a test approach for each trail is recorded in sequence, equipments for aiding the trail and a pre-known test result are stored in the test database.

The function of the operating and maintenance is performed in a base station environment management station (BEMS), that is, the BEMS is a subsystem wherein the operating and maintenance of the BS is performed.

The BEMS performs a proper recovery procedure when an abnormal state happens by supervising a state of a generated process, initializes and manages a message queue for an IPC communication between internal application processes and transmits a system output message received at a queue to a relevant process.

In the IMT-2000 system including an operating and maintenance system such as the BEMS, interface between the BEMS that is considered a user interface system and a subsystem is performed, based on a serial processing and a real-time processing modes. Accordingly, there is caused a disadvantage that data processing is complicated and is not easy for a system developer to perform.

SUMMARY OF THE INVENTION

It is an object of the present invention to provide a method for an operating and maintenance using a remote procedure call in an international mobile telecommunication-2000 (IMT-2000) system, when establishing the operating and maintenance between a base station (BS) and a base station environment management system (BEMS).

In accordance with an aspect of the present invention, there is provided a method for an operating and maintenance of a base station (BS) using a remote procedure call (RPC) in an international mobile telecommunication-2000 (IMT-2000) system which includes a base station environment management system (BEMS), a RPC process, an access control processor (ACP), an ATM interface processor (AIP) and an access signaling processor (ASP), including the steps of: generating a server module and a client module; declaring a global object at the server module; generating a function module at the sever module; independently transmitting and receiving a message at the function module generated at the server module; generating a function module at the client module; and independently transmitting and receiving the message at the function module generated at the client module.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
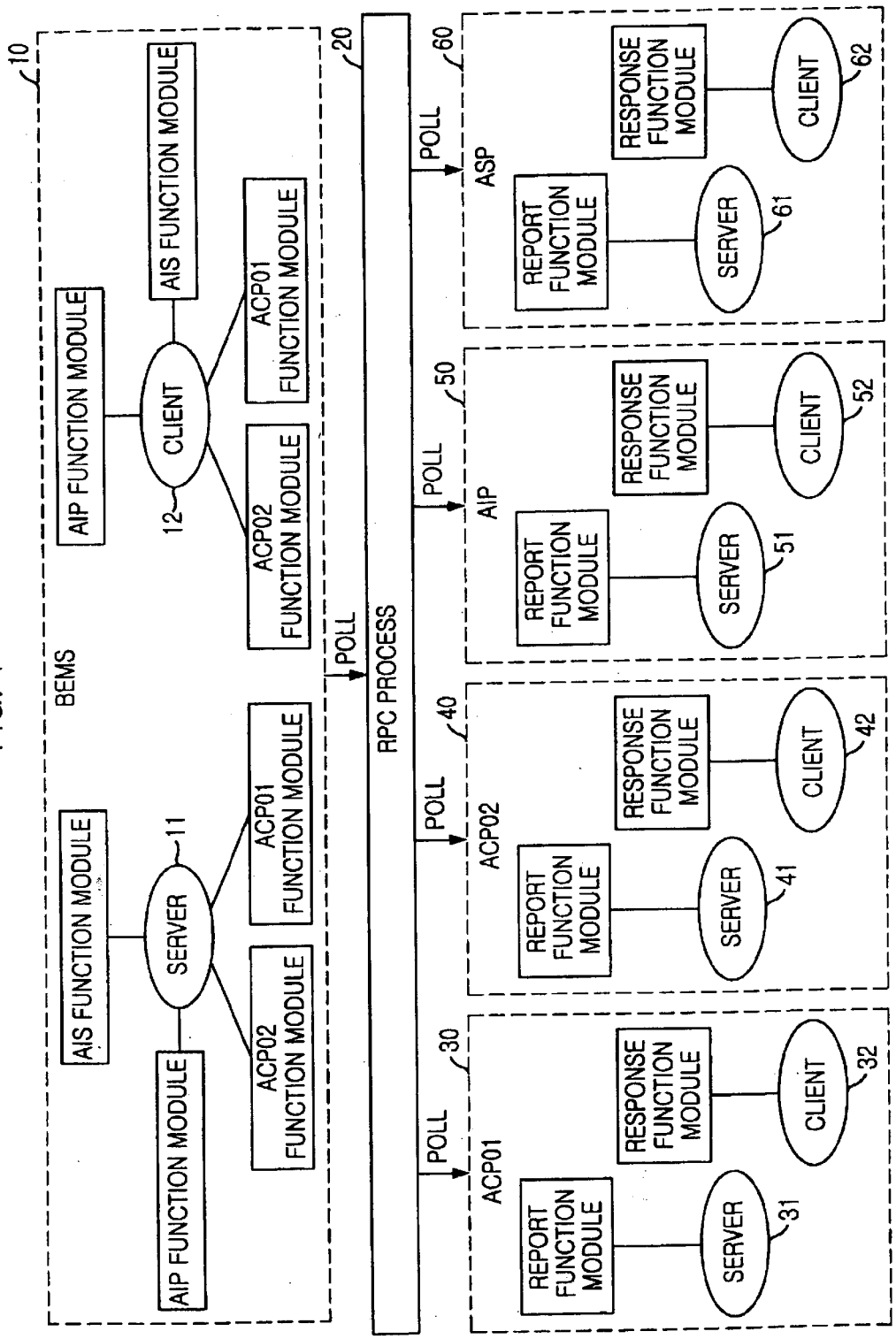
FIG. 1 is a schematic diagram showing an international mobile telecommunication-2000 (IMT-2000) operating and maintenance system model that is structured based on a method for an operating and maintenance using a remote procedure call in accordance with the present invention.

FIG. 1 is a schematic diagram showing an IMT-2000 operating and maintenance system model that is structured based on a method for an operating and maintenance using a remote procedure call in accordance with the present invention.

Referring to FIG. 1, reference numerals 10 and 20 denote a base station environment management system (BEMS), a remote procedure call (RPC) process, respectively. Reference numerals 30 and 40 both denote an access control processor (ACP) wherein an operating and maintenance of a base station (BS) is managed and each ACP is coupled to the RPC process 20. Reference numeral 50 denotes a asynchronous transfer mode (ATM) interface processor (AIP) which performs an ATM cell routing and is coupled to the RPC process 20. Reference numeral 60 denote an access signaling processor (ASP) which performs a signal processing required for being coupled to a core network (CN) and is coupled to the RPC process 20.

The BEMS 10 generates a server module 11 and a client module 12 and each of the server module 11' and the client module 12 performs relevant functions independently. However, all variables which are used at the client module 12 should be generated and dealt with at the server module 11, to thereby reduce a memory occupation.

In the same way, each ACP 30 and 40 generates server modules 31 and 41 and client modules 32 an 42, respectively, and each of the server module 31 and 41 and the client module 32 and 42 performs relevant functions independently.

Also, The AIP 50 generates a server module 51 and a client module 52 and each of the server module 51 and the client module 52 performs relevant functions independently. The ASP 60 generates a server module 61 and a client module 62 and each of the server module 61 and the client module 62 performs relevant functions independently.

In other words, the above modules included in the BEMS can perform their functions independently, based on an object-oriented process concept that each of a plurality of function modules are assumed to be a function object. The server modules declare each management object to be a global object and controls the global object to deal with a data processing output acquired at the function object, to thereby decrease a load of the server module and increase a performance of the operating and maintenance system.

As shown in FIG. 1, The BEMS transmits a poll signal to the RPC process and also, the RPC process transmits the poll signal to the ACPs, the AIP and the ASP. The poll signal contains a check message that is used for checking operation states of each sub-system.

Figure 2:
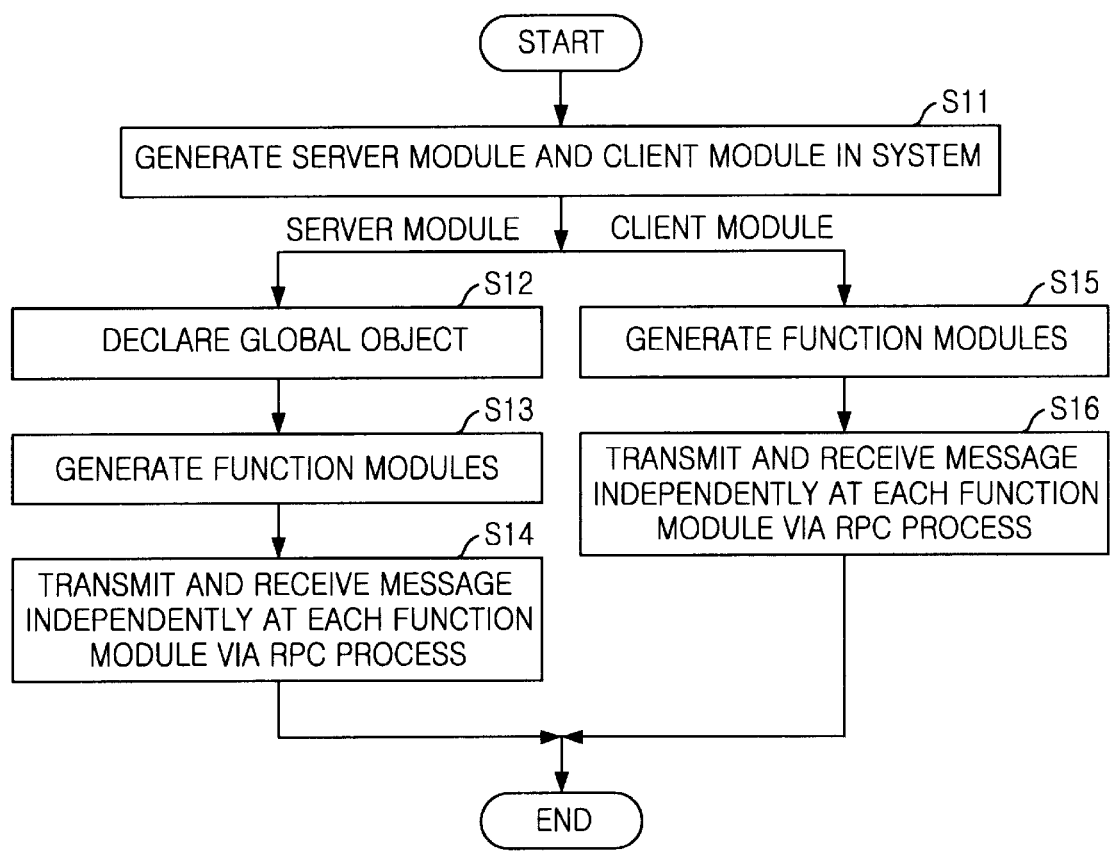
FIG. 2 is a flow chart illustrating a method for an operating and maintenance of a base station using a remote procedure call in an IMT-2000 system.

FIG. 2 is a flow chart illustrating a method for an operating and maintenance of a base station using a remote procedure call in an international mobile telecommunication-2000 (IMT-2000) system.

Referring to FIG. 2, at step S11, a server module and a client module are generated in a system. For example, if the system is a base station environment management system (BEMS), the server module and the client module are generated in the BEMS. If the system is an access control processor (ACP), the server module and the client module are generated in the ACP. If the system is an ATM interface processor (AIP), the server module and the client module are generated in the AIP. If the system is an access signaling processor (ASP), the server module and the client module are generated in the ASP.

At step S12, the server module declares a global object. The global object generates and provides all variables which are used by the server module, the client module and each function module generated by the server module and the client module, to thereby reduce a memory occupation.

At step S13, function modules are generated in the server module. Each function module performs corresponding functions.

At step S14, each function module transmits and receives messages via a remote procedure call (RPC) process independently. That is, each of the server module and the function modules is operated independently and transmits and receives the messages via the remote procedure call (RPC) process independently.

At step S15, function modules are generated in the client module. Each function module performs corresponding functions.

At step S16, each function module transmits and receives the messages via the remote procedure call (RPC) process independently.

As can be seen from described above, the server module and the client module are generated in each system, the global object is dealt with by the server module, the generated function modules perform the corresponding functions and then performed contents are applied to the global object, so that a load of the system can be reduced. Also, when adding or deleting some system, all that is needed is adding or deleting some function module, so that it is easy for a system developer to perform an access and a management for data processing.

Although the preferred embodiments of the invention have been disclosed for illustrative purpose, those skilled in the art will appreciate that various modifications, additions, and substitutions are possible, without departing from the scope and sprit of the invention as disclosed in the accompanying claims.

What is claimed is:

1. A method for operation and maintenance of a base station (BS) using a remote procedure call (RPC) in an international mobile telecommunication-2000 (IMT-2000) system which includes a base station environment management system (BEMS), a RPC process, an access control processor (ACP), an asynchronous transfer mode (ATM) interface processor (AIP) and an access signaling processor (ASP), the method comprising the steps of:

a) individually generating a server module and a client module in the BEMS, the ACP, the AIP and the ASP in said IMT-2000 system;

b) declaring each global object at the server module;

c) generating a function module at the server module;

d) independently transmitting and receiving a message at the function module generated at the server module based on said RPC;

e) generating a function module at the client module; and f) independently transmitting and receiving the message at the function module generated at the client module based on said RPC.

2. The method as recited in claim 1, wherein the global object generates and provides all variables which are used at the server module, the client module and the function modules generated at each of the server module and the client module.

3. A method for operation and maintenance of a base station (BS) using a remote procedure call (RPC) in an international mobile telecommunication-2000 (IMT-2000) system which includes a base station environment management system (BEMS), a RPC process, an access control processor (ACP), an asynchronous transfer mode (ATM) interface processor (AIP) and an access signaling processor (ASP), the method comprising the steps of:

a) individually generating a server module and a client module in each of the BEMS, the ACP, the AIP and the ASP in said IMT-2000 system;

b) declaring each global object at server modules in the BEMS, the ACP, the AIP and the ASP;

c) generating an AIP function module, an ASP function module and an ACP function at the server module in the BEMS;

d) independently transmitting and receiving a message based on said RPC between the AIP function module, the ASP function module and the ACP function module of the server module in the BEMS and the AIP, the ACP and the ASP;

e) generating an AIP function module, an ASP function module and an ACP function module at the client module in the BEMS; and f) independently transmitting and receiving the message based on said RPC between the AIP function module, the ASP function module and the ACP function module of the client module in the BEMS and the AIP, the ACP and the ASP.

* * * * *